US012675573B2

(12) United States Patent
King et al.

(10) Patent No.:　US 12,675,573 B2
(45) Date of Patent:　Jul. 7, 2026

(54) QUANTUM ECHO ENCRYPTION AND RETROSPECTIVE DECRYPTION MITIGATION

(71) Applicant: Bank of America Corporation, Charlotte, NC (US)

(72) Inventors: Adam Kristian King, Fort Mill, SC (US); James Siekman, Charlotte, NC (US); Sanjay Lohar, Charlotte, NC (US); Matthew Bryant, Mount Holly, NC (US); Catherine Cunningham, Charlotte, NC (US); Takiyah Watford, Fort Mill, SC (US); Elizabeth Swanzy-Parker, Charlotte, NC (US); Peter Nein, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 123 days.

(21) Appl. No.: 18/891,040

(22) Filed: Sep. 20, 2024

(65) Prior Publication Data

US 2026/0093811 A1　　Apr. 2, 2026

(51) Int. Cl.
　*G06F 21/00*　　(2013.01)
　*G06F 21/56*　　(2013.01)
　*H04L 9/08*　　(2006.01)

(52) U.S. Cl.
　CPC .......... *G06F 21/566* (2013.01); *H04L 9/0852* (2013.01)

(58) Field of Classification Search
　CPC .............................. G06F 21/566; H04L 9/0852
　See application file for complete search history.

(56) References Cited

U.S. PATENT DOCUMENTS

2016/0248581 A1*　8/2016　Fu .......................... H04L 9/0858
2018/0309785 A1*　10/2018　Kurian ................ H04L 63/1475
2023/0188335 A1*　6/2023　Lamas Linares ... H04L 63/0428
　　　　　　　　　　　　　　　　　713/168
2024/0372696 A1*　11/2024　Zhandry ............... H04L 9/0858
2025/0016142 A1*　1/2025　Szymanski ......... H04L 63/0485

OTHER PUBLICATIONS

Sivakumar, Jananya, and Sannasi Ganapathy. "An effective data security mechanism for secured data communications using hybrid cryptographic technique and quantum key distribution." Wireless Personal Communications 133.3 (2023): 1373-1396. (Year: 2023).*

* cited by examiner

*Primary Examiner* — Ka Shan Choy
(74) *Attorney, Agent, or Firm* — Weiss & Arons LLP

(57)　　　　　ABSTRACT

Methods, systems, and apparatus may encrypt data using an encryption key and securely store the encrypted data on a quantum medium so that the data is not accessed without authorization. The encrypted data may be stored on a quantum medium in the form of quantum bits that are encoded as quantum-entangled particles having correlated quantum states. An authorized user at a second quantum computer may access the stored data and decrypt the data with a copy of the encryption key that may be obtained from the first quantum computer via quantum tunneling. An intrusion attempt by an unauthorized party to access the quantum encrypted data via the quantum medium may cause one or more echoes to be generated and passed into the quantum medium. The echoes may disturb the quantum-entangled particles and make the quantum encrypted data unintelligible to the unauthorized party so that the encrypted data cannot be accessed.

20 Claims, 8 Drawing Sheets

TOFFOLI GATE

| INPUT | | | OUTPUT | | |
|---|---|---|---|---|---|
| 0 | 0 | 0 | 0 | 0 | 0 |
| 0 | 0 | 1 | 0 | 0 | 1 |
| 0 | 1 | 0 | 0 | 1 | 0 |
| 0 | 1 | 1 | 0 | 1 | 1 |
| 1 | 0 | 0 | 1 | 0 | 0 |
| 1 | 0 | 1 | 1 | 0 | 1 |
| 1 | 1 | 0 | 1 | 1 | 1 |
| 1 | 1 | 1 | 1 | 1 | 0 |

505

TRUTH TABLE

503

MATRIX FORM

501

SYMBOL

600

610
OBTAIN DATA ENCRYPTED AS QUANTUM ENTANGLED PARTICLES

620
DETECT UNAUTHORIZED INTRUSION ATTEMPT

630
TRIGGER, IN RESPONSE TO INTRUSION, GENERATION OF ONE OR MORE ECHOES

700

710
ENCRYPTION DATA AS QUANTUM BITS

720
ENCODING THE ENCRYPTED BITS AS QUANTUM ENTANGLEMENT PARTICLES

730
STORING THE ENCODED DATA IN A QUANTUM MEDIUM CONFIGURED TO HAVE A QUANTUM ECHO EFFECT

QUANTUM ECHO ENCRYPTION AND RETROSPECTIVE DECRYPTION MITIGATION

FIELD OF THE DISCLOSURE

Aspects of the disclosure relate to secure storage of encrypted data in a quantum medium and mitigating an unauthorized intrusion to access the encrypted data.

BACKGROUND OF THE DISCLOSURE

Data breaches, leaks, and hacks pose significant threats to the security and integrity of sensitive and confidential information. These incidents may result in widespread damage if compromised data is misappropriated, such as by selling the data or selling access to the data, for example, on the dark web. Existing security measures struggle to contain the aftermath of such incidents, allowing unauthorized code to proliferate. There is a pressing need for solutions that can mitigate or prevent data breaches, thereby safeguarding sensitive and confidential information from malicious activity and unauthorized access.

Data may be encrypted by encrypting one or more data packets. Encryption may contribute to maintaining contents as confidential and private. However, existing encryption methods face a persistent challenge from post-quantum computing vulnerability encapsulated in the phrase "harvest now, decrypt later" (also known as "retrospective decryption"). The phrase describes a scenario wherein encrypted data that is currently stored long term or indefinitely may be accessed by a third party without authorization now. The third party may not be decryptable now. However, the third party may store the encrypted data packet awaiting improvements in decryption technology with the hope that what cannot be decrypted today may be decrypted tomorrow. Over time, as computing power increases with newer technology and decryption techniques are enhanced, the encrypted data may become decryptable, and sensitive and confidential encrypted information may become compromised.

It would be desirable to provide an encryption method that encrypts data in a manner that mitigates the possibility of later decryption without authorization.

SUMMARY OF THE DISCLOSURE

It is an object of this invention to provide a system and method for providing secure storage of quantum encrypted data on a quantum medium that prevents later access and decryption by an unauthorized party.

A method in accordance with the present disclosure may be implemented for mitigating unauthorized decryption of encrypted data using a quantum computer. The mitigation may prevent decryption of the encrypted data. The mitigation may prevent access to the data. The method may include storing, by a quantum processor at the quantum computer, quantum encrypted data that has been encoded as quantum bits and encrypted using an encryption key to generate quantum-entangled particles having correlated quantum states. The quantum medium may be configured to retain the correlated quantum states of the quantum-entangled particles. The quantum-entangled particles may be stored in a quantum medium that is in communication with the quantum processor and that is configured to enable one or more echoes to pass into the quantum medium.

The method may include detecting, by the quantum processor, an intrusion attempt by an unauthorized party to access the quantum encrypted data via the quantum medium without permission. The method may include triggering, by the quantum processor, in response to the detected intrusion attempt, generation of the one or more echoes that, due to a quantum echo effect on the quantum medium, cause an overlap of quantum states of the stored quantum-entangled particles, and make the quantum encrypted data unintelligible to the unauthorized party.

The intrusion attempt may include an attempt by the unauthorized party to intercept or decrypt the quantum encrypted data that has been stored in the quantum medium. The intrusion attempt may be detected by a detector in communication with the quantum computer.

The one or more echoes may be generated by a device that generates echoes in the quantum medium. The one or more echoes may be generated outside of the quantum medium, but may pass through the quantum medium. The one or more echoes may be generated instantaneously in response to the intrusion attempt targeting the quantum encrypted data that is encoded into the quantum-entangled particles. The quantum material may be configured so that the one or more echoes become overlapped in a feedback loop to further make the encrypted quantum bits unintelligible. The quantum echo effect may be triggered in the quantum medium without disturbing the quantum encrypted data stored in the quantum medium.

A method in accordance with the present disclosure may be implemented for securely storing data encrypted using a quantum computer to prevent or mitigate unauthorized decryption of the data. The method may include encrypting, by a quantum processor at the quantum computer, the data as quantum bits using an encryption key. The method may include encoding, by the quantum processor, the encrypted quantum bits as quantum-entangled particles having correlated quantum states. The method may include storing, by the quantum processor, the quantum-entangled particles in a quantum medium that is configured to have a quantum echo effect. The quantum echo effect may cause an overlap of quantum states of the stored quantum-entangled particles. The quantum echo effect may make the encrypted quantum bits unintelligible to the unauthorized party by enhancing an echo that passes through the quantum medium.

The quantum medium may be configured to withstand an intrusion attempt to the quantum medium by an unauthorized party to access the quantum encrypted data when the echo passes through the quantum medium. The echo passing through the quantum medium may cause an overlap of quantum states of the quantum-entangled particles that may make the quantum encrypted data unintelligible to the unauthorized party.

The encryption key may be generated by the quantum processor. The encryption key may be generated before encrypting the data.

The method may include transmitting, by the quantum processor, a copy of the encryption key from the first quantum computer to a second quantum computer by causing quantum tunneling of the copy of the encryption key through a potential energy barrier. The quantum tunneling of the copy of the encryption key may enable quantum tunneling key exchange to establish a secure encryption key exchange between the first quantum computer and the second quantum computer. The receipt of the encryption key at the second quantum computer may enable decryption of the quantum encrypted data at the second quantum computer using the encryption key.

The second quantum computer may be configured to access the quantum medium to obtain the quantum encrypted data. The second quantum computer may disentangle the quantum-entangled particles in which the quantum encrypted data is stored, and may decrypt the quantum encrypted data upon a determination by the second quantum computer that a user communication for the quantum encrypted data is authorized. When the access to the quantum medium is authorized, there may be no echoes generated in the quantum medium.

The second quantum computer may be configured to detect an intrusion attempt by an unauthorized party to access the encrypted data via the quantum medium without permission. The second quantum computer may trigger, in response to the detected intrusion attempt, generation of one or more echoes that, due to the quantum echo effect, may cause an overlap of quantum states of the quantum-entangled particles, and may make the encrypted quantum bits unintelligible to the unauthorized party.

A method in accordance with the present disclosure may be implemented for providing an encryption key from a first quantum computer to a second quantum computer to decrypt encrypted data at the second quantum computer. The method may include obtaining, by a quantum processor of the first quantum computer, a copy of the encryption key used to encrypt the encrypted data. The method may include transmitting, by the quantum processor, the copy of the encryption key to the second quantum computer by causing quantum tunneling of the copy of the encryption key through a potential energy barrier. The quantum tunneling of the copy of the encryption key may enable a quantum tunneling key exchange to establish a securely exchange the copy of the encryption key between the first quantum computer and the second quantum computer for decrypting the encrypted data.

The encryption key may be generated by the quantum processor before the encryption key is used to encrypt the encrypted data. The encrypted data may have been encoded and stored as quantum-entangled particles within a quantum medium. The quantum-entangled particles may have correlated quantum states.

The quantum medium may be configured to have a quantum echo effect that causes an overlap of quantum states of the stored quantum-entangled particles, and makes the encrypted quantum bits unintelligible to an unauthorized party that attempts to access the encrypted data stored in the quantum medium. The copy of the encryption key may be transmitted by the quantum processor to the second quantum computer upon receipt of a request for the copy of the encryption key by the second quantum computer. The copy of the encryption key may be transmitted from the quantum processor to the second quantum computer without a request by the second quantum computer for the copy of the encryption key.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
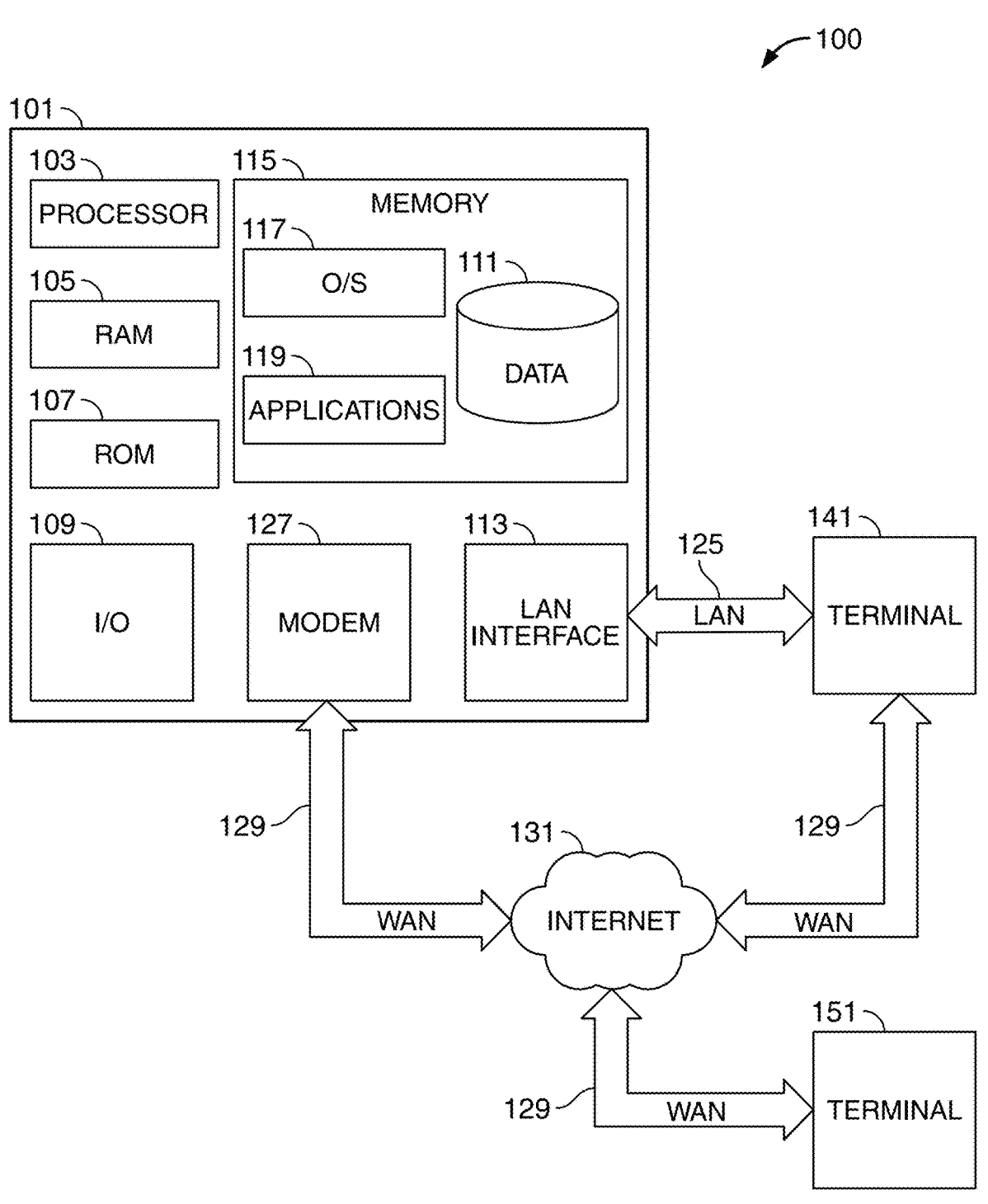
FIG. 1 shows an illustrative system architecture in accordance with principles of the disclosure.

Methods, systems, and apparatus may be provided for encrypting and securely storing the encrypted data, such as for an extended period, while preventing or mitigating the chance that quantum computer technology will be able to access or decrypt the data without authorization. The encrypted data may be stored on a quantum medium on which data is stored in the form of quantum bits ("qubits"). The quantum bits may be stored as quantum-entangled particles.

Encrypting the data packet may include use of an encryption standard. Encrypting the data packet may include use of a post-quantum cryptography ("PQC") standard. The encryption standard or PQC may include, for example, Cryptographic Suite for Algebraic Lattices ("CRYSTALS")-Kyber, CRYSTALS-Dilithium, SPHINCS+, FALCON, or combinations thereof.

The methods, systems, and apparatus may harness the entanglement of the particles. The particle entanglement may create a shield around data transmissions such that the data is not just encrypted but is encoded into the fabric of the quantum-entangled particles. The shield may be impenetrable. Quantum-entangled particles may be generated so that their quantum states are directly linked to the bits of data being encrypted. This entanglement may persist even when the particles are separated by large distances. The entanglement of the particles may make it virtually impossible to access, intercept or decrypt the encrypted data without disturbing the entangled state.

The encrypted data may be stored within a quantum medium that is capable of retaining quantum states over time. By virtue of having quantum-entangled particles, the quantum medium may have a quantum echo effect, whereby an echo that passes through the quantum medium will disrupt the ability to read the quantum medium. Therefore, quantum encryption may be considered an echo encryption. When an unauthorized attempt is made to access encrypted data stored in the quantum medium or to intercept or decrypt the data, the disturbance caused by the intrusion may trigger an instantaneous "echo" response that passes within the quantum medium, and may render the intercepted data useless. The party that encrypted the data and stored the data in the quantum medium may also be alerted of an intrusion attempt in response to the echo. The echo may cause overlapping of quantum states, which become further overlapped as in a feedback loop, scrambling the data and effectively causing the data to be unintelligible (like multiple voices reverberating in an enclosed space).

Data that is encrypted and stored in a quantum medium using echo encryption may be more secure than data that is encrypted by conventional encryption methods that rely on mathematical complexity. Even the most advanced quantum computing techniques may not be successful to overcome the inherent randomness and unpredictability of quantum states.

To initiate secure communication channels for enabling encrypted data to be securely transmitted from one quantum computer to another quantum computer, a quantum tunneling key exchange may be employed. In this exchange, an encryption key stored in the form of quantum particles may tunnel through potential energy barriers to establish a secure exchange of encryption keys between communicating parties without the risk of interception or tampering.

Quantum-tunneling effect is a property of quantum physics. Quantum-tunneling enables a particle to pass through a physical barrier even if it does not have enough energy to go over the barrier. The pass through effect, or tunneling effect, enables particles to possibly penetrate the physical barrier. A particle is more or less probable to pass through the physical barrier based on one or more criteria. The criteria include the size of the particle and the thickness of the physical barrier. A smaller particle is more probable to pass through a physical barrier, and a thinner barrier is a more likely conduit to allow a particle to pass through.

The quantum-entangled particles may be used both to encode and decode encrypted messages. Entangled particles may share a correlated quantum state, meaning that the state of one particle instantaneously influences the state of its entangled partner, regardless of the distance between them. The correlated quantum state may ensure the security of a communication channel that passes through a quantum medium. Any attempt to intercept or measure the quantum-entangled particles would disturb their delicate quantum state, thereby alerting parties communicating through a quantum medium to potential eavesdropping attempts.

In addition to alerting parties to the possibility of eavesdropping, the entanglement of the particles may provide the ability to disrupt unauthorized users from accessing data on the quantum medium by generating one or more echoes that pass into the quantum medium. The one or more echoes may be generated instantaneously in response to an intrusion attempt.

Authorized users may be enabled to access the encrypted data stored on the quantum medium using an encryption key. In embodiments, the same encryption key may be used for encryption and decryption. Authorized users who are provided with a copy of the encryption key that was used for the encryption may be able to decrypt the encrypted data that is stored on the quantum medium with the same encryption key. In embodiments, the encryption key may be transmitted from one quantum computer to another quantum computer by quantum tunneling of the encryption key through a potential energy barrier. By use of the encryption key, authorized users may gain access to the encrypted data and decrypt the encrypted data without being detected as an unauthorized intrusion and generating echoes in the quantum medium.

By contrast, unauthorized users may be prevented from decrypting the data upon detection of the attempted intrusion. The quantum processor may provide access control to the quantum medium. When the data is stored at a quantum medium, the intrusion may be detected by a quantum processor associated with the quantum medium. Upon detection of an intrusion, the quantum processor may cause one or more echoes to be generated within the quantum medium. The echoes may be quantum echoes. For example, a wave may be generated and, as the wave passes through the quantum medium, an echo effect property in the quantum material may cause one or more echoes to be generated within the quantum material. The echoes may cause the quantum-entangled particles to move such that the capture of data encoded within the particles is not possible. Unauthorized users who intrude on the system, such as by attempting to gain access without authorization.

Illustrative embodiments of methods, systems, and apparatus in accordance with the principles of the disclosure will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The methods, apparatus, computer program products, and systems described herein are illustrative and may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative block diagram of system 100 that includes computer 101. Computer 101 may alternatively be referred to herein as an "engine," a "server," a "computing system," or a "computing device." Computer 101 may be a quantum computer or part of a quantum computer. Elements of system 100, including computer 101, may be used to implement various aspects of the systems and methods disclosed herein. A "user" of computer 101 may include other computer systems or servers or computing devices.

Computer 101 may have one or more "N" qubit processors as well as standard microprocessors 103 for controlling the operation of the device and its associated components, and may include RAM 105, ROM 107, input/output circuit 109, and a non-transitory or non-volatile memory 115. Machine-readable memory may be configured to store information in machine-readable data structures. The processors 103 may also execute all software running on computer 101, such as the operating system and applications. Processors 103 may establish quantum entanglement between qubits, such as entanglement between qubits in different locations. Other components commonly used for computers, such as EEPROM or Flash memory or any other suitable components, may also be part of the computer 101.

Memory 115 may be comprised of any suitable permanent storage technology—e.g., a hard drive or other non-transitory memory. Memory 115 may store software including the operating system 117 and application(s) 119 along with any data 111 needed for the operation of computer 101. Memory 115 may also store applications, videos, text, and/or audio assistance files. The data stored in Memory 115 may also be stored in cache memory, or any other suitable memory. Alternatively, some or all of computer executable instructions (alternatively referred to as "code") may be embodied in hardware or firmware (not shown).

Memory 115 may store data as quantum states. Data may be transferred between qubits through quantum entanglement. Data may be stored on qubits as quantum states that are correlated to quantum states on other qubits. Data may be transferred between qubits through quantum entanglement.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all the elements described above relative to computer 101.

In some embodiments, computer 101 and/or Terminals 141 and 151 may be any of mobile devices that may be in electronic communication with consumer device 106 via LAN, WAN, or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, NFT, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting, and/or displaying relevant information. Terminal 151 and/or terminal 141 may be one or more user devices. Terminals 151 and 141 may be identical to computer 101 or different. The differences may be related to hardware components and/or software components. These terminals may be other quantum computers. Quantum computers may interact with each other over a quantum network.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 2:
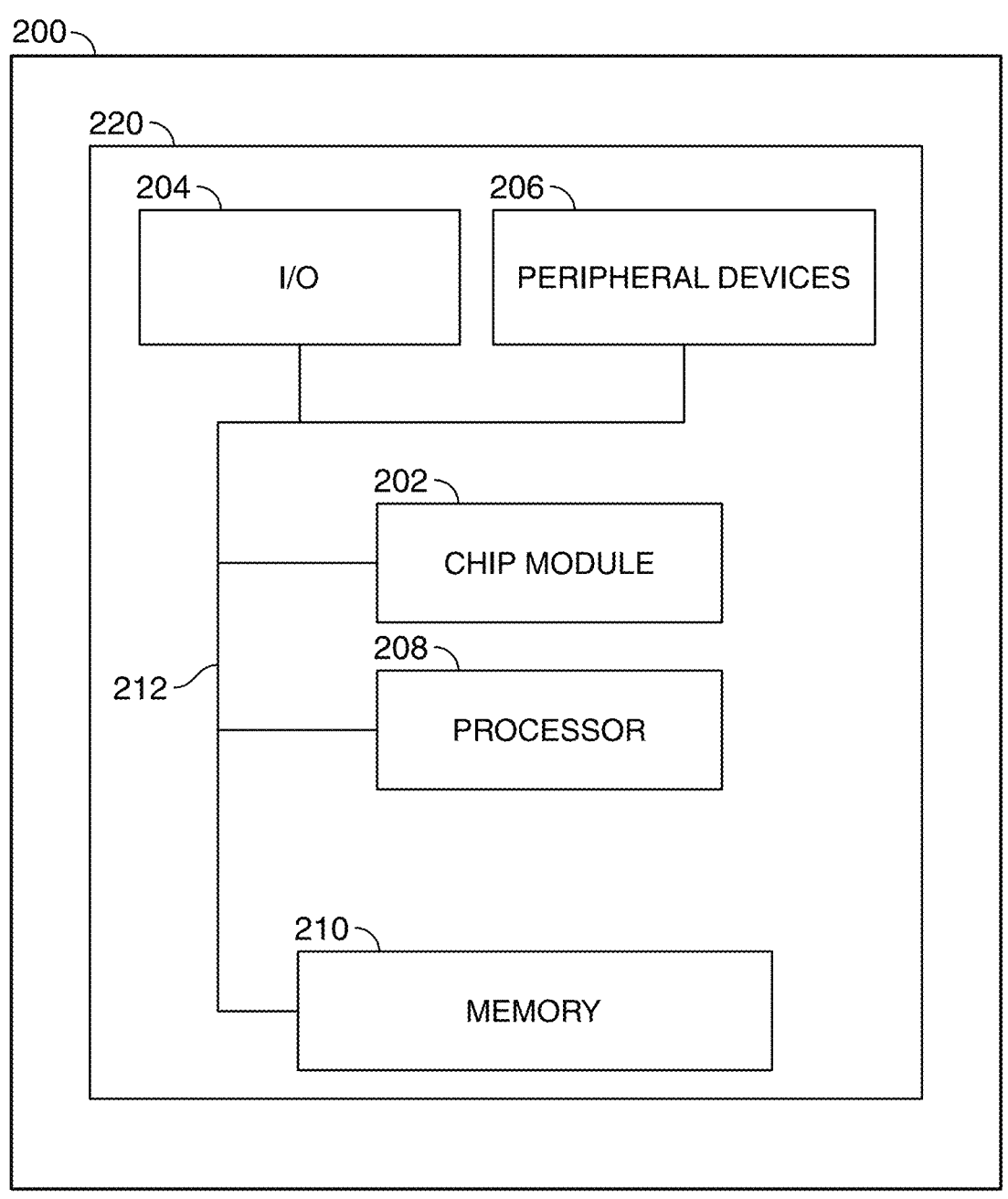
FIG. 2 shows an illustrative apparatus of a device in accordance with principles of the disclosure.

FIG. 2 shows illustrative apparatus 200, which may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY level hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

For the sake of illustration, the invention will be described as being performed by a "system." The system may include one or more features of apparatus and methods that are described herein and/or any other suitable device or approach.

The system may include a quantum processor. A quantum processor may be used herein to refer to a computing device whose operations can harness aspects of quantum mechanics, such as superposition, interference, and entanglement.

Quantum processors are associated with vastly improved efficiencies over standard computers. Standard computers represent data in bits, which can be either 0 or 1. Quantum processors use qubits which utilize superposition (i.e., the ability to be in multiple states at the same time) to allow for a state of 0, 1, or any probability of being 0 or 1. The probabilities may be manipulated using matrix-based quantum gates, which are analogous to standard logic gates. Qubits are therefore able to represent many more data possibilities than a bit-based system of the same size. This allows for greater speed and less memory usage than standard systems.

A qubit in a state of superposition may not have a defined value because it may hold many potential values at the same time. When measured, the qubit wave function collapses to a defined state. When an entangled qubit is in a state of superposition, each of its entangled connections is also in a state of superposition. These combinations of uncertainties exponentially increase the power of quantum processors.

The quantum processor may include a default number of quantum threads. Each quantum thread may include a default number of quantum circuits. Quantum circuits may refer to hardware and software based computational models that include quantum gates and are used for executing quantum computations.

In some embodiments, at least one of the quantum circuits may include a Toffoli gate. A feature of the Toffoli gate is its universal nature, meaning the structure is able to represent standard operations as well as quantum operations. In some embodiments, at least one of the quantum circuits may include a Hadamard gate. A feature of the Hadamard gate is the ability to represent a superposition state.

Quantum computing may be referred to as the use of quantum-mechanical phenomena such as superposition and entanglement to perform computations. The smallest bit in a quantum computing system may be called a qubit.

Executable instructions may be executed by an "N" qubit processor on a computer system. "N" may be a number between two and ten thousand.

The amount of data that a quantum computing system may be able to hold and manipulate may grow exponentially with the number of qubits included in the quantum computing system's processing core. A quantum computing system with "N" qubits may be able to simultaneously represent 2N states. Therefore, two qubits may hold four states, three qubits may hold eight states, fifty qubits may hold 1,125, 899,906,842,624 states, and 10,000 qubits may hold 210000 states.

Other standard components of a computer system may be present, such as communication links, displays, input and output devices, read-only and random-access memory, and other components.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The non-transitory memory may be configured to store executable data configured to run on the "N" qubit processor and/or a standard processor.

The "N" qubit processor or standard processors may control the operation of the computer system and its components, which may include RAM, ROM, an input/output module, and other memory.

Other components commonly used for computers, such as EEPROM or Flash memory or any other suitable components, may also be part of the apparatus and computer system.

A communication link may enable communication with other computers and servers, as well as enable the program to communicate with databases. The communication link may include any necessary hardware (e.g., antennae) and software to control the link. Any appropriate communication link may be used, such as Wi-Fi, Bluetooth, LAN, and cellular links. Multiple communication links may be present. In some embodiments, the network used to communicate may be the Internet. In some embodiments, the network may be an internal intranet or other internal network.

Figure 3:
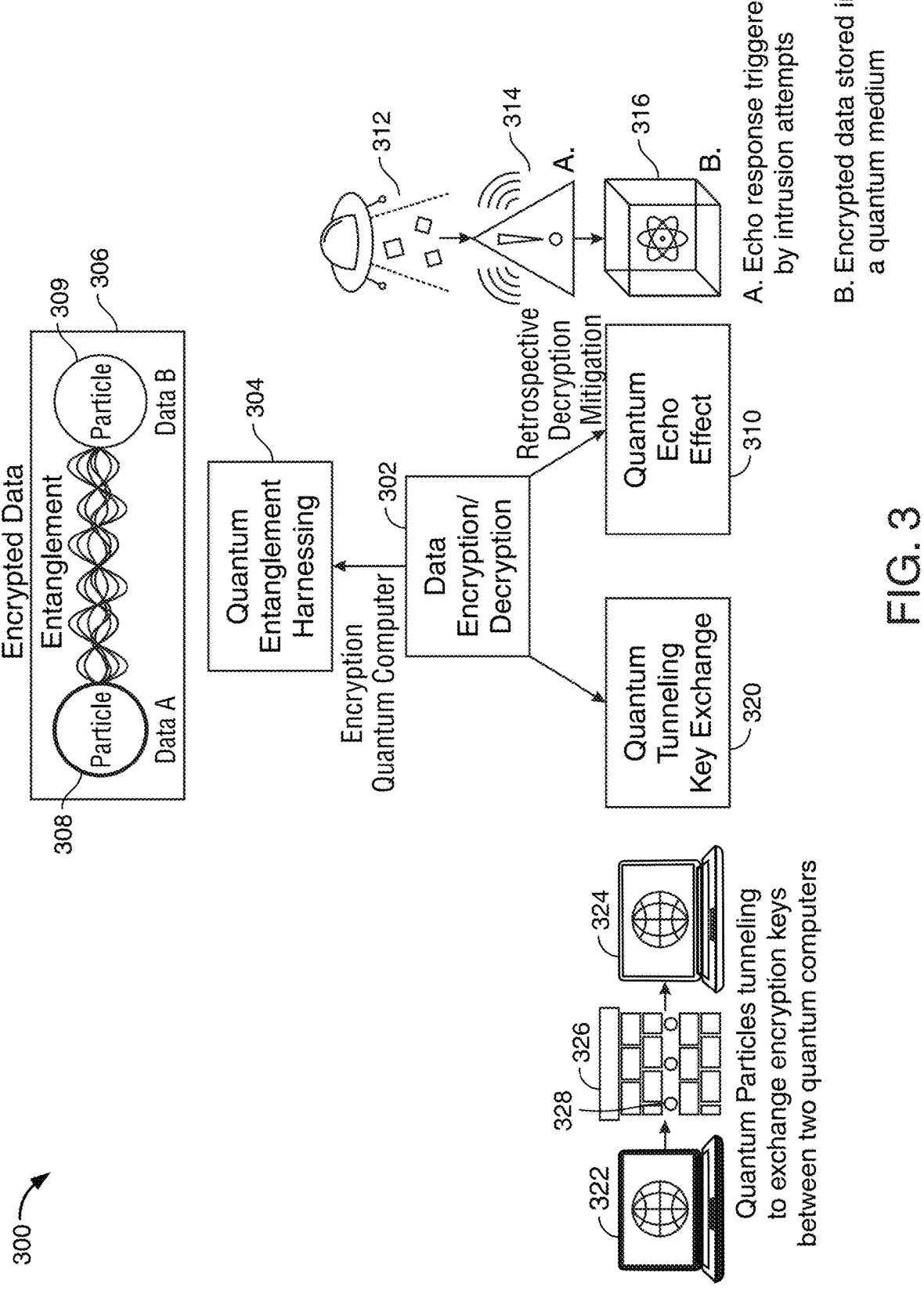
FIG. 3 shows an illustrative diagram in accordance with principles of the disclosure.

FIG. 3 shows illustrative diagram 300 of features related to a data encryption/decryption process 302 that enables post-quantum encryption of data and decryption of the encrypted data by authorized users, but prevents or mitigates a possibility of later decryption of the data by unauthorized users. Features involved in data encryption/decryption process 302 may include quantum entanglement harnessing 304, quantum echo effect 310, and quantum tunneling key exchange 320.

Data may be encrypted with an encryption key and entangled as quantum particles at 304. Box 306 shows an illustrative example of particle 308 that represents Data A being entangled with particle 309 that represents Data B.

The quantum-entangled particles may be stored in a quantum medium. The quantum-entangled particles may be stored in a quantum medium 316 that provides a quantum echo effect 310.

An unauthorized user may attempt to access the data using an electronic device. This may be detected, such as by hardware, software or a combination thereof associated with quantum medium 316. Upon detection of an intrusion attempt to access the data, quantum wave generator 312 may emit a wave that impinges upon quantum medium 316. This wave may trigger one or more echoes in quantum medium 316 when the wave hits a surface of the quantum medium. The one or more echoes may prevent access to the encrypted data because the entangled particles may vibrate so that the data cannot be intercepted or, if it is intercepted, the data may be rendered useless. The echo may cause overlap of quantum states, which may become further overlapped as in a feedback loop, may scramble the data, and may effectively cause any intercepted data to be unintelligible (like multiple voices reverberating in an enclosed space).

Upon detection of the intrusion, an alert 314 may be transmitted to the provider of the encrypted data that is stored at the quantum medium.

In quantum tunneling key exchange 320, a first quantum computer 322, which may belong to a first user, may generate or obtain an encryption key 328 that is used to encrypt data as quantum-entangled particles. The encryption key may be stored on a quantum medium 326. Quantum medium 326 may be the same as quantum medium 316 or may be a different quantum medium. A second quantum computer 324 may be authorized to access the encrypted data, but may not yet have a copy of the encryption key 328 needed to decrypt the quantum encrypted data. Encryption key 328 may be transported over a communication channel that passes through quantum medium 326 by quantum tunneling of encryption key 328 to overcome a potential energy barrier in quantum medium 326.

The copy of the encryption key may be transmitted from the quantum processor to the second quantum computer upon receiving a request for the copy of the encryption key from the second quantum computer. Alternatively, the copy of the encryption key may be transmitted from the quantum processor to the second quantum computer without a request from the second quantum computer for the copy of the encryption key. The encryption key may be transmitted without a request such as, for example, in a situation where there is an existing trusted relationship between the first and second quantum computers.

Figure 4:
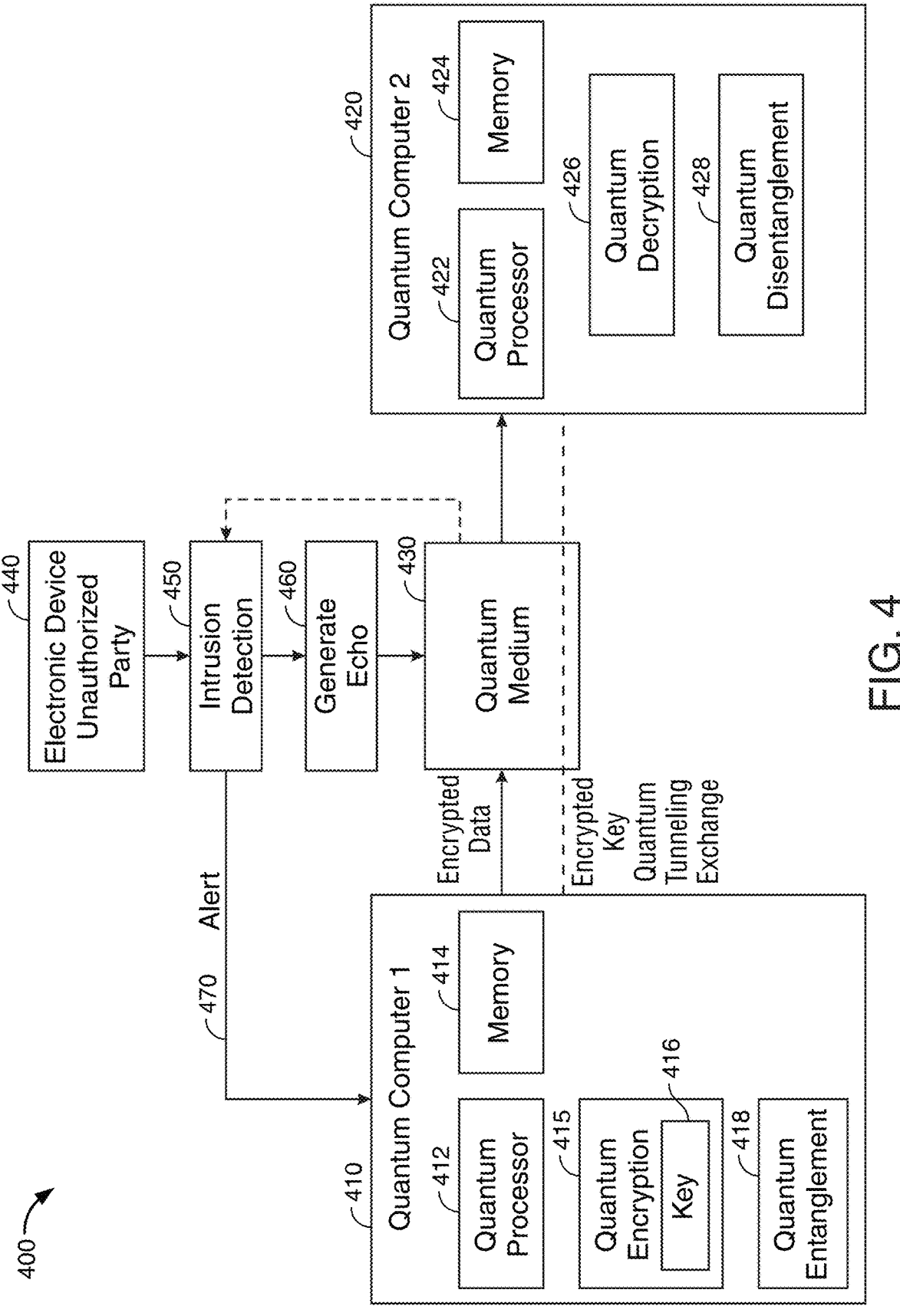
FIG. 4 shows an illustrative system architecture in accordance with principles of the disclosure.

FIG. 4 shows an illustrative architecture diagram that may be used in accordance with principles of the disclosure.

A first computer, quantum computer 1 410 may include a quantum processor 412, and a memory 414. Computer 410 may include a quantum encryption algorithm 415 that quantum 412 processor may use to obtain or generate an encryption key 416 for encrypting data. Encryption key may be stored in memory 414. Computer 410 may include a quantum entanglement algorithm 418 to encode the encrypted data and stored it on a quantum medium 430 as quantum-entangled bits.

Quantum medium 430 may be part of computer 410. Quantum medium 430 may be separate from computer 410 and may be in communication with computer 410, such as via a network.

Quantum processor 412 may include Hadamard gate. Quantum processor may include automatic scaling, wherein the processor may be initialized with a default size that may include a number of quantum threads, each thread including a cluster of quantum circuits. The scaling may include dynamically adjusting the number of threads and/or circuits based on the present computing task.

A second computer, quantum computer 2 420 may include a quantum processor 422, and a memory 424. Computer 420 may include a quantum decryption algorithm 426. Computer 420 may include a quantum disentanglement algorithm 428. Upon receiving a copy of encryption key 416, computer 420 may disentangle the quantum-entangled particles using quantum disentanglement algorithm 428, and decrypt the encrypted data represented by the disentangled particles using quantum decryption algorithm 426.

An unauthorized party using an electronic device 440 may attempt to access the encrypted data stored on quantum medium 430. Electronic device 440 may be detected by an intrusion detection device 450 that detects an intruder. Intrusion detection device 450 may be configured to detect and prevent, or mitigate a possibility of, an intrusion that attempts to access encrypted data in the quantum medium. Intrusion detection device 450 may be implemented in hardware, software, or both. Intrusion detection device 450 may detect a party that attempts to circumvent one or more of an electronic access system, including a login or authentication protocol, a router, or a firewall. Intrusion detection device 450 may detect anomalies in the quantum medium that may be associated with an intrusion attempt.

Intrusion analysis performed by intrusion detection device 450 may include the use of an intrusion detection system and/or an intrusion prevention system (or "intrusion mitigation system") to identify presence of a third party in a host's interconnected computations system 102.

An intrusion attempt may trigger generation of an echo at 460 that passes through quantum medium 430. As an example, an echo may be generated as shown in FIG. 3 by generating a wave that impinges upon a surface of a material and is transmitted through the quantum medium. The echo may block the intrusion attempt.

An alert 470 (such as a warning or notification) may be transmitted by intrusion detection device 450 to first quantum computer 410 or to another party, such as the party that maintains quantum medium 430 to advise of the intrusion attempt. The party receiving the alert may implement measures to strengthen security for accessing the quantum medium.

Figure 5A:
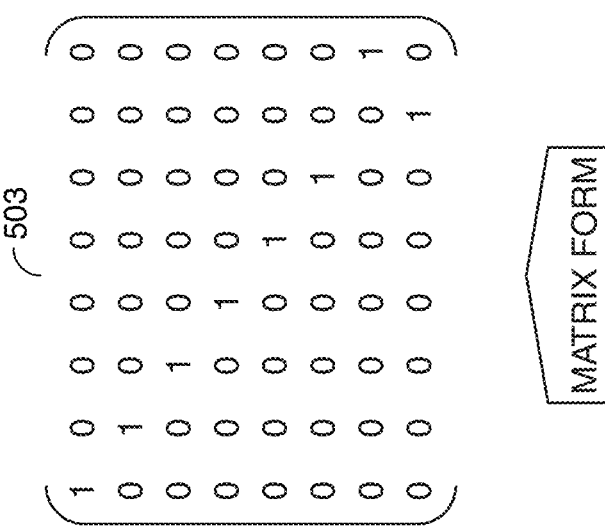
FIGS. 5A and 5B show illustrative diagrams in accordance with the principles of the disclosure.
Figure 5A:
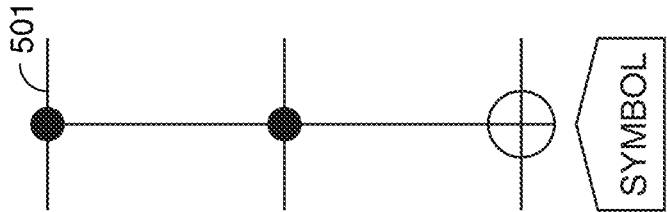
Figure 5B:
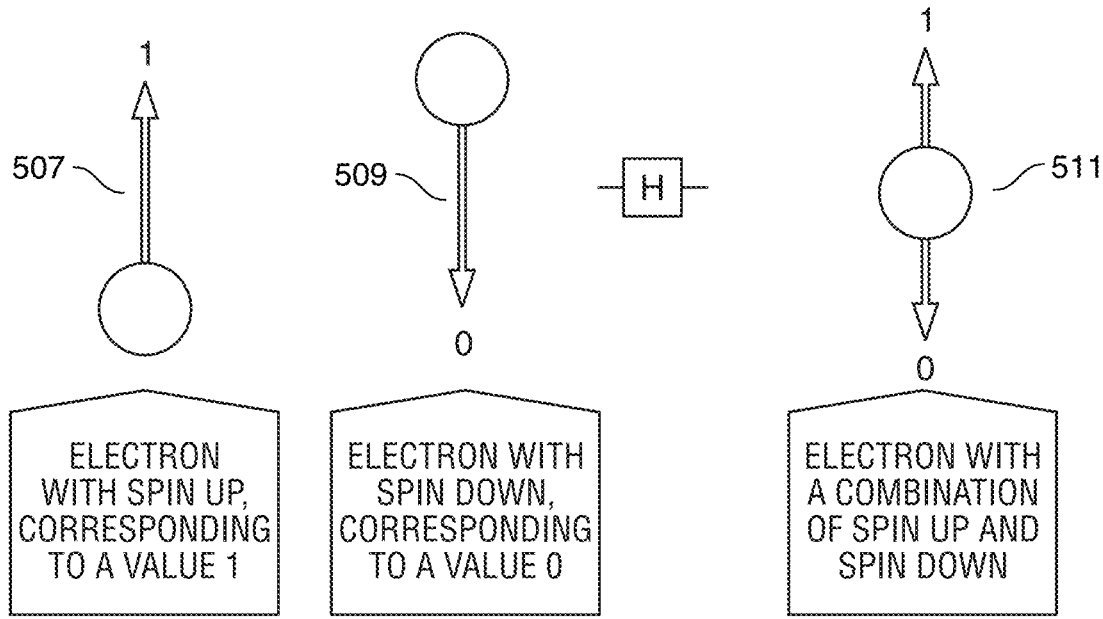

FIG. 5A-5B show illustrative diagrams of exemplary quantum gates in accordance with principles of the disclosure.

FIG. 5A shows symbol 501, matrix form 503, and truth table 505 of a Toffoli gate. A Toffoli gate is a universal reversible logic gate, which means that it enables simulation of any standard reversible circuit. In operation, as seen in truth table 505, the Toffoli gate has a 3-bit input and 3-bit outputs. The first two output bits always mirror the first two input bits. The third bit also stays the same unless the first two input bits are both set to 1—in which case the third output bit is inverted from the third input bit. The Toffoli gate is therefore also known as the "controlled-controlled-not" gate.

FIG. 5B shows representations of a Hadamard gate. Symbol 507 shows a representation of electron spin up, which corresponds to the value 1. Symbol 509 shows a representation of electron spin down, which corresponds to the value 0. Symbol 511 shows a representation of electron spin up and down, which corresponds to the value that represents a superposition of 1 and 0.

Figures 6, 7:
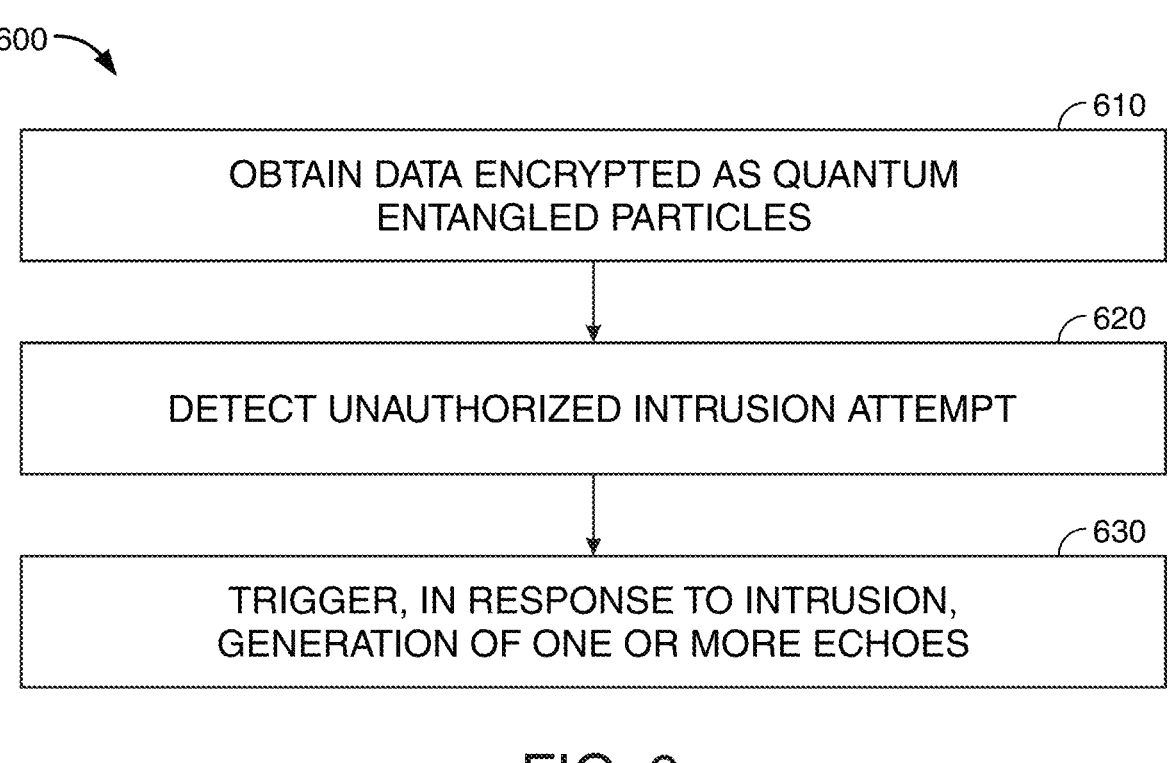
FIG. 6 shows an illustrative flow chart for preventing or mitigating unauthorized decryption of encrypted data in accordance with the principles of the disclosure.
FIG. 7 shows an illustrative flow chart for storing encrypted data that mitigates a possibility of unauthorized decryption in accordance with the principles of the disclosure.

FIG. 6 shows an illustrative embodiment of a flow chart 600 for preventing or mitigating a possibility of unauthorized decryption of encrypted data using a quantum computer in accordance with principles of the disclosure. At step 610, a quantum processor at a quantum computer may store quantum encrypted data that has been encoded as quantum bits and encrypted using an encryption key to generate quantum-entangled particles having correlated quantum states. The quantum-entangled particles may be stored in a quantum medium that is in communication with the quantum processor. The quantum medium may be configured to enable one or more echoes to pass into the quantum medium. At step 620, the quantum processor may detect an intrusion attempt by unauthorized party to access the quantum encrypted data via the quantum medium without permission. At step 630, the quantum processor may trigger the generation of the one or more echoes in response to the detected intrusion attempt. A quantum echo effect on the quantum medium may cause an overlap of quantum states of the stored quantum-entangled particles, and may make the quantum encrypted data unintelligible to the unauthorized party.

FIG. 7 shows an illustrative embodiment of a flow chart 700 for securely storing data encrypted using a quantum computer to prevent or mitigate possible unauthorized decryption of the data in accordance with principles of the disclosure. At step 710, a quantum processor at the quantum computer may encrypt the data as quantum bits using an encryption key. At step 720, the quantum processor may encode the encrypted quantum bits as quantum-entangled particles having correlated quantum states. At step 720, the quantum processor may store the quantum-entangled particles in a quantum medium that is configured to have a quantum echo effect. The quantum echo effect may cause an overlap of quantum states of the stored quantum-entangled particles, and make the encrypted quantum bits unintelligible to the unauthorized party by enhancing an echo that passes through the quantum medium.

Figure 8:
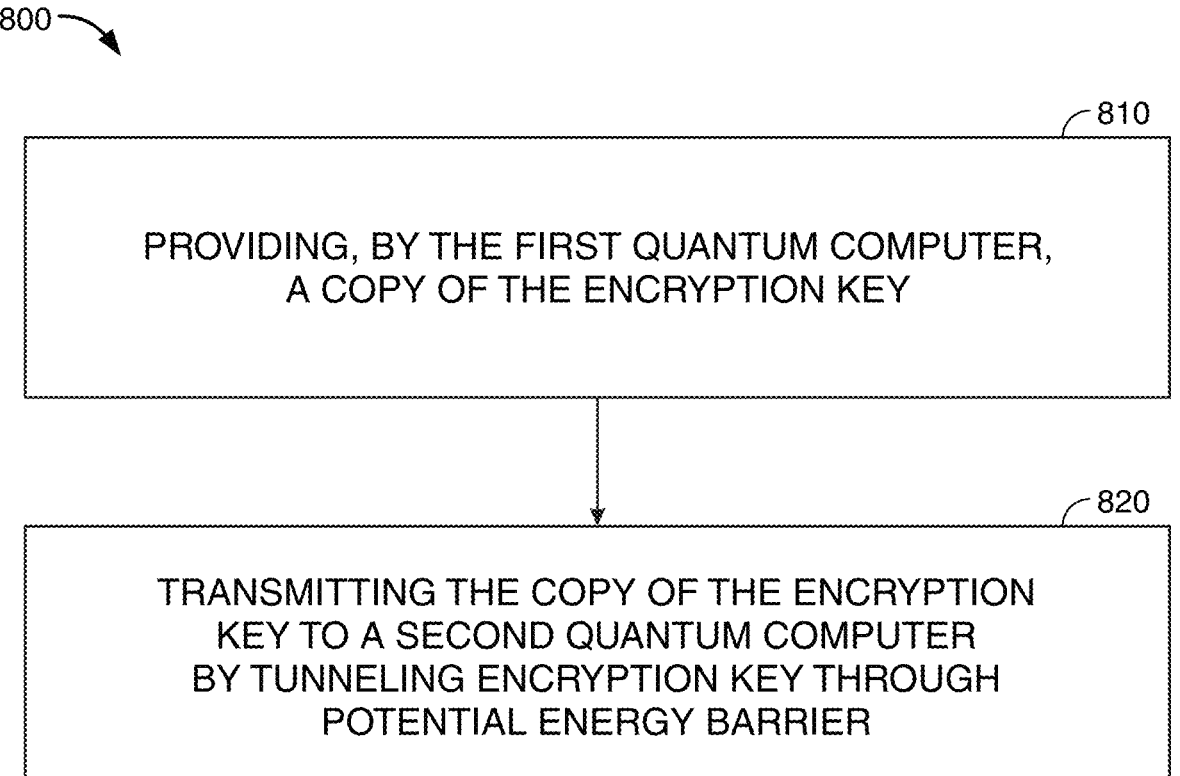
FIG. 8 shows an illustrative flow chart for enabling a secure transfer of an encryption key in accordance with the principles of the disclosure.

FIG. 8 shows an illustrative embodiment of a flow chart 800 for securely storing data encrypted using a quantum computer to prevent or mitigate unauthorized decryption of the data in accordance with principles of the disclosure. At step 810, a quantum processor of the first quantum computer may generate or obtain a copy of the encryption key used to encrypt the encrypted data. The quantum processor may transmit the copy of the encryption key to the second quantum computer by causing quantum tunneling of the copy of the encryption key through a potential energy barrier. The quantum tunneling of the copy of the encryption key may enable a quantum tunneling key exchange to establish a securely exchange the copy of the encryption key between the first quantum computer and the second quantum computer for decrypting the encrypted data. The encryption key may be generated by the quantum processor before the encryption key is used to encrypt the encrypted data.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods, apparatus, and systems for quantum echo encryption and retrospective decryption mitigation may be provided. Persons skilled in the art will appreciate that the present invention can be practiced by other than the described embodiments, which are presented for purposes of illustration rather than of limitation.

What is claimed is:

1. A method for mitigating unauthorized decryption of encrypted data using a quantum computer, the method comprising:

storing, by a quantum processor at the quantum computer, quantum encrypted data that has been encoded as quantum bits and encrypted using an encryption key to generate quantum-entangled particles having correlated quantum states;

wherein the quantum-entangled particles are stored in a quantum medium that is in communication with the quantum processor and that is configured to enable one or more echoes to pass into the quantum medium;

detecting, by the quantum processor, an intrusion attempt by an unauthorized party to access the quantum encrypted data via the quantum medium without permission; and triggering, by the quantum processor, in response to the detected intrusion attempt, generation of the one or more echoes that, due to a quantum echo effect on the quantum medium, causes an overlap of quantum states of the stored quantum-entangled particles, and makes the quantum encrypted data unintelligible to the unauthorized party.

2. The method of claim 1, wherein the intrusion attempt comprises an attempt by the unauthorized party to intercept or decrypt the quantum encrypted data that has been stored in the quantum medium.

3. The method of claim 1, wherein the one or more echoes are generated by a device that generates echoes in the quantum medium.

4. The method of claim 3, wherein the one or more echoes are generated instantaneously in response to the intrusion attempt targeting the quantum encrypted data that is encoded into the quantum-entangled particles.

5. The method of claim 4, wherein the intrusion attempt is detected by a detector in communication with the quantum computer.

6. The method of claim 1, wherein the quantum medium is further configured to retain the correlated quantum states of the quantum-entangled particles.

7. The method of claim 1, wherein the quantum material is further configured so that the one or more echoes become overlapped in a feedback loop to further make the encrypted quantum bits unintelligible.

8. The method of claim 1, wherein the quantum echo effect is triggered without disturbing the quantum encrypted data stored in the quantum medium.

9. A method for securely storing data encrypted using a quantum computer to prevent or mitigate unauthorized decryption of the data, the method comprising:

encrypting, by a quantum processor at the quantum computer, the data as quantum bits using an encryption key;

encoding, by the quantum processor, the encrypted quantum bits as quantum-entangled particles having correlated quantum states; and storing, by the quantum processor, the quantum-entangled particles in a quantum medium that is configured to have a quantum echo effect;

wherein the quantum echo effect causes an overlap of quantum states of the stored quantum-entangled particles, and makes the encrypted quantum bits unintelligible to an unauthorized party by enhancing an echo that passes through the quantum medium.

10. The method of claim 9, wherein:

the quantum medium is further configured to withstand an intrusion attempt to the quantum medium by the unauthorized party to access quantum encrypted data when the echo passes through the quantum medium; and the echo passing through the quantum medium causes an overlap of quantum states of the quantum-entangled particles that makes the quantum encrypted data unintelligible to the unauthorized party.

11. The method of claim 9, wherein the encryption key is generated by the quantum processor before encrypting the data.

12. The method of claim 9, further comprising:

transmitting, by the quantum processor, a copy of the encryption key from the first quantum computer to a second quantum computer by causing quantum tunneling of the copy of the encryption key through a potential energy barrier;

wherein the quantum tunneling of the copy of the encryption key enables quantum tunneling key exchange to establish a secure encryption key exchange between the first quantum computer and the second quantum computer.

13. The method of claim 12, wherein a receipt of the encryption key at the second quantum computer enables decryption of quantum encrypted data at the second quantum computer using the encryption key.

14. The method of claim 12, wherein the second quantum computer is configured to disentangle the quantum-entangled particles and decrypt quantum encrypted data upon a determination by the second quantum computer that a user communication for the quantum encrypted data is authorized.

15. The method of claim 12, wherein the second quantum computer is configured to detect an intrusion attempt by the unauthorized party to access encrypted data via the quantum medium without permission, and to trigger, in response to the detected intrusion attempt, one or more echoes that, due to the quantum echo effect, causes an overlap of quantum states of the quantum-entangled particles, and makes the encrypted quantum bits unintelligible to the unauthorized party.

16. A method for providing an encryption key from a first quantum computer to a second quantum computer to decrypt encrypted data at the second quantum computer, the method comprising:

obtaining, by a quantum processor of the first quantum computer, a copy of the encryption key used to encrypt the encrypted data; and transmitting, by the quantum processor, the copy of the encryption key to the second quantum computer by causing quantum tunneling of the copy of the encryption key through a potential energy barrier;

wherein the quantum tunneling of the copy of the encryption key enables a quantum tunneling key exchange to establish a secure exchange of the copy of the encryption key between the first quantum computer and the second quantum computer for decrypting the encrypted data.

17. The method of claim 16, wherein the encryption key is generated by the quantum processor before the encryption key is used to encrypt the encrypted data.

18. The method of claim 16, wherein:

the encrypted data has been encoded and stored as quantum-entangled particles within a quantum medium; and the quantum-entangled particles have correlated quantum states.

19. The method of claim 16, wherein the quantum medium is configured to have a quantum echo effect that causes an overlap of quantum states of the stored quantum-entangled particles, and makes the encrypted quantum bits unintelligible to an unauthorized party that attempts to access the encrypted data stored in the quantum medium.

20. The method of claim 16, wherein the copy of the encryption key is transmitted by the quantum processor to the second quantum computer upon receipt of a request for the copy of the encryption key by the second quantum computer.

* * * * *